(12) United States Patent
Chae et al.

(10) Patent No.: US 10,606,130 B2
(45) Date of Patent: Mar. 31, 2020

(54) LIQUID CRYSTAL DISPLAY

(71) Applicant: Samsung Display Co., Ltd., Yongin-Si, Gyeonggi-Do (KR)

(72) Inventors: Kyung Tae Chae, Hwaseong-si (KR); Sung Jin Kim, Seongnam-si (KR); Don Chan Cho, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/413,529

(22) Filed: May 15, 2019

(65) Prior Publication Data

US 2019/0265526 A1  Aug. 29, 2019

Related U.S. Application Data

(62) Division of application No. 15/636,932, filed on Jun. 29, 2017, now Pat. No. 10,330,987.

(30) Foreign Application Priority Data

Oct. 5, 2016  (KR) .......................... 10-2016-0128106

(51) Int. Cl.
*G02F 1/1339* (2006.01)
*G02F 1/1335* (2006.01)
*G02F 1/1337* (2006.01)
(Continued)

(52) U.S. Cl.
CPC .......... *G02F 1/1339* (2013.01); *G02F 1/1343* (2013.01); *G02F 1/13394* (2013.01);
(Continued)

(58) Field of Classification Search
CPC .............. G02F 1/13394; G02F 1/1339; G02F 1/133514; G02F 2001/136222;
(Continued)

(56) References Cited

U.S. PATENT DOCUMENTS 6,788,380 B2   9/2004  Melnik et al.
7,286,204 B2  10/2007  Yang et al.
(Continued)

FOREIGN PATENT DOCUMENTS

KR  10-2012-0032416 A  4/2012
KR  10-2015-0053707 A  5/2015
KR  10-2016-0035527 A  3/2016
KR  10-2018-0011386 A  2/2018

*Primary Examiner* — Jia X Pan
(74) *Attorney, Agent, or Firm* — Innovation Counsel LLP

(57) ABSTRACT

A liquid crystal display is provided. The liquid crystal display includes a first display substrate, a second display substrate which faces the first display substrate, and a liquid crystal layer which is disposed between the first display substrate and the second display substrate. The first display substrate comprises a first base substrate, a reflective electrode which is disposed on the first base substrate, and a pixel electrode which is disposed on the reflective electrode. The second display substrate comprises a second base substrate, a color filter layer which comprises a first color filter disposed on a surface of the second base substrate which faces the first base substrate and a second color filter configured to display a different color from the first color filter, a protruding pattern which is formed on a surface of the color filter layer facing the first base substrate and which extends along a boundary between the first color filter and the second color filter, and reflective members which are disposed on sidewalls of the protruding pattern.

9 Claims, 12 Drawing Sheets

(51) Int. Cl.
*G02F 1/1343* (2006.01)
*G02F 1/1333* (2006.01)

(52) U.S. Cl.
CPC .. *G02F 1/133514* (2013.01); *G02F 1/133553* (2013.01); *G02F 1/133707* (2013.01); *G02F 1/133305* (2013.01); *G02F 2203/02* (2013.01)

(58) Field of Classification Search
CPC ........... G02F 2201/52; G02F 1/133707; G02F 1/133553; G02F 2203/02; G09G 3/2003; G09G 2300/0452; G09G 2300/0443; G09G 3/3607; G09G 3/3611; G09G 5/02; G02B 5/201; H01L 27/322; H01L 27/3213; H01L 27/3218; H01L 27/3211; H01L 51/5271
See application file for complete search history.

(56) References Cited

U.S. PATENT DOCUMENTS

| | | | |
|---|---|---|---|
| 2008/0049176 A1* | 2/2008 | Kim | G02F 1/133555 |
| | | | 349/114 |
| 2008/0198310 A1 | 8/2008 | Kim | |
| 2010/0090595 A1* | 4/2010 | Nomura | B29D 11/00596 |
| | | | 313/506 |
| 2010/0302492 A1* | 12/2010 | Kubota | G02F 1/134363 |
| | | | 349/138 |
| 2011/0013131 A1 | 1/2011 | Tanaka et al. | |
| 2011/0096255 A1* | 4/2011 | Rho | C09K 19/0275 |
| | | | 349/33 |
| 2011/0128491 A1* | 6/2011 | Kubota | G02F 1/133707 |
| | | | 349/139 |

\* cited by examiner

LIQUID CRYSTAL DISPLAY

This application is a divisional application of U.S. patent application Ser. No. 15/636,932 filed on Jun. 29, 2017, which claims the benefit of Korean Patent Application No. 10-2016-0128106, filed on Oct. 5, 2016, in the Korean Intellectual Property Office, the disclosure of which is incorporated herein by reference in its entirety.

BACKGROUND

1. Field

The present inventive concept relates generally to a liquid crystal display (LCD), and more particularly, to a reflective LCD.

2. Description of the Related Art

A liquid crystal display (LCD) is a display device that displays an image by controlling light transmittance or reflectivity, in turn by controlling the molecular alignment state of liquid crystals. LCDs consume low power and are lightweight. Therefore, LCDs are widely used for various devices ranging from small-sized devices such as mobile phones, digital cameras and portable information devices to large-sized monitors and TVs.

LCDs can be divided into transmissive LCDs and reflective LCDs according to the light source used. A transmissive LCD displays an image by transmitting light emitted from a backlight module through a liquid crystal panel, and a reflective LCD displays an image using external light reflected by a liquid crystal panel.

The transmissive LCD has low light utilization efficiency because only about ⅕ of the light emitted from the backlight module passes through the liquid crystal panel, and has high power consumption because more than ⅔ of the total power is consumed in the backlight module. On the other hand, the reflective LCD uses external light instead of employing a separate light source. Therefore, power consumption is minimized.

In general, the reflective LCD includes a first display substrate including a switching device, a pixel electrode and a reflective layer, a second display substrate including a common electrode, a color filter and a light blocking member, and a liquid crystal layer interposed between the first display substrate and the second display substrate. Here, the light blocking member of the second display substrate is positioned at a boundary portion of each pixel to prevent the leakage of light and improve a reflection contrast ratio.

The light blocking member reduces an aperture ratio of the reflective LCD due to its light blocking property. Thus, a reflective LCD without the light blocking member has been proposed.

However, if the light reflective member is omitted, a boundary between adjacent pixels is not completely hidden. Therefore, a mixture of two colors displayed respectively by the adjacent pixels may be displayed around the boundary between the adjacent pixels.

SUMMARY

Aspects of the inventive concept provide a liquid crystal display (LCD) in which color mixture is reduced or minimized.

However, aspects of the inventive concept are not restricted to the ones set forth herein. The above and other aspects of the inventive concept will become more apparent to one of ordinary skill in the art to which the inventive concept pertains by referencing the detailed description of the inventive concept given below.

According to an aspect of the inventive concept, there is provided a liquid crystal display. The liquid crystal display comprises a first display substrate, a second display substrate which faces the first display substrate, and a liquid crystal layer which is disposed between the first display substrate and the second display substrate. The first display substrate comprises a first base substrate, a reflective electrode which is disposed on the first base substrate and a pixel electrode which is disposed on the reflective electrode. The second display substrate comprises a second base substrate, a color filter layer which comprises a first color filter disposed on a surface of the second base substrate which faces the first base substrate and a second color filter displaying a different color from that of the first color filter, a protruding pattern which is formed on a surface of the color filter layer facing the first base substrate and which extends along a boundary between the first color filter and the second color filter, and reflective members which are disposed on sidewalls of the protruding pattern.

According to other aspect of the inventive concept, there is provided a liquid crystal display. The liquid crystal display comprises a first display substrate, a second display substrate which faces the first display substrate, and a liquid crystal layer which is disposed between the first display substrate and the second display substrate. The first display substrate comprises a first base substrate, a reflective electrode which is disposed on the first base substrate, a pixel electrode which is disposed on the reflective electrode, a protruding pattern which is disposed on the pixel electrode and reflective members which are disposed on sidewalls of the protruding pattern. The second display substrate comprises a second base substrate and a color filter layer which comprises a first color filter disposed on a surface of the second base substrate which faces the first base substrate and a second color filter configured to display a different color from that of the first color filter, wherein the protruding pattern extends along a boundary between the first color filter and the second color filter.

According to the other aspect of the inventive concept, there is provided a liquid crystal display. The liquid crystal display comprises a first display substrate, a second display substrate which faces the first display substrate, and a liquid crystal layer which is disposed between the first display substrate and the second display substrate. The first display substrate comprises a first base substrate, an organic film which is disposed on the first base substrate and which comprises a flat portion having a flat upper surface and a protruding portion protruding from the flat portion toward the second display substrate, a reflective electrode which comprises a first reflective portion disposed on the flat portion and second reflective portions disposed on sidewalls of the protruding portion and a pixel electrode which is disposed on the reflective electrode. The second display substrate comprises a second base substrate, and a color filter layer which comprises a first color filter disposed on a surface of the second base substrate that faces the first base substrate and a second color filter configured to display a different color from that of the first color filter.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
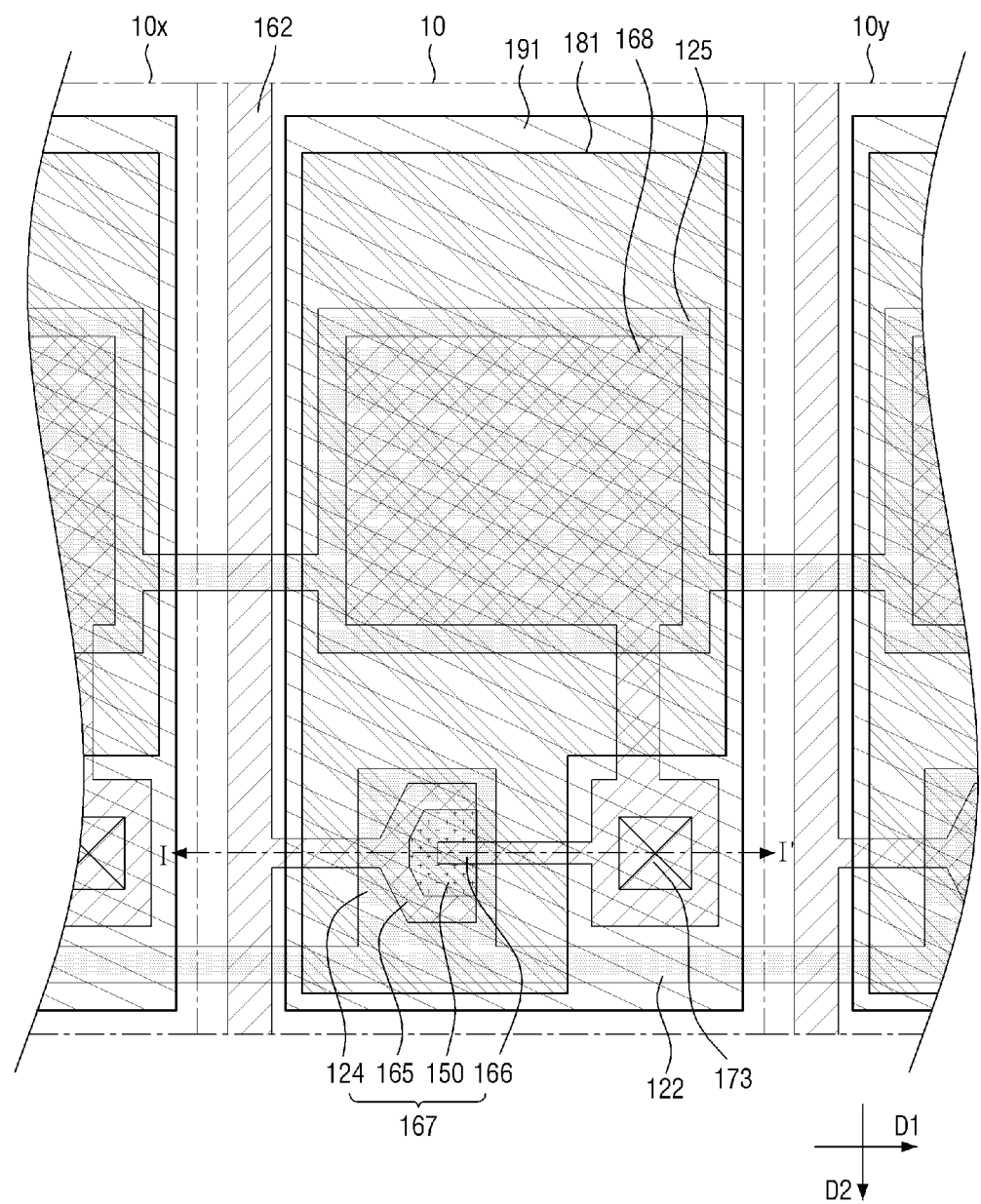
FIG. 1 is a layout view of a pixel of a liquid crystal display (LCD) according to an embodiment.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

All numerical values are approximate, and may vary. All examples of specific materials and compositions are to be taken as nonlimiting and exemplary only. Other suitable materials and compositions may be used instead.

In the present invention, an electronic apparatus may be any apparatus provided with a display device. Examples of the electronic apparatus may include smart phones, mobile phones, navigators, game machines, TVs, car head units, notebook computers, laptop computers, tablet computers, personal media players (PMPs), and personal digital assistants (PDAs). The electronic apparatus may be embodied as a pocket-sized portable communication terminal having a wireless communication function. Further, the display device may be a flexible display device capable of changing its shape.

Hereinafter, embodiments of the present invention will be described with reference to the attached drawings.

Figure 2:
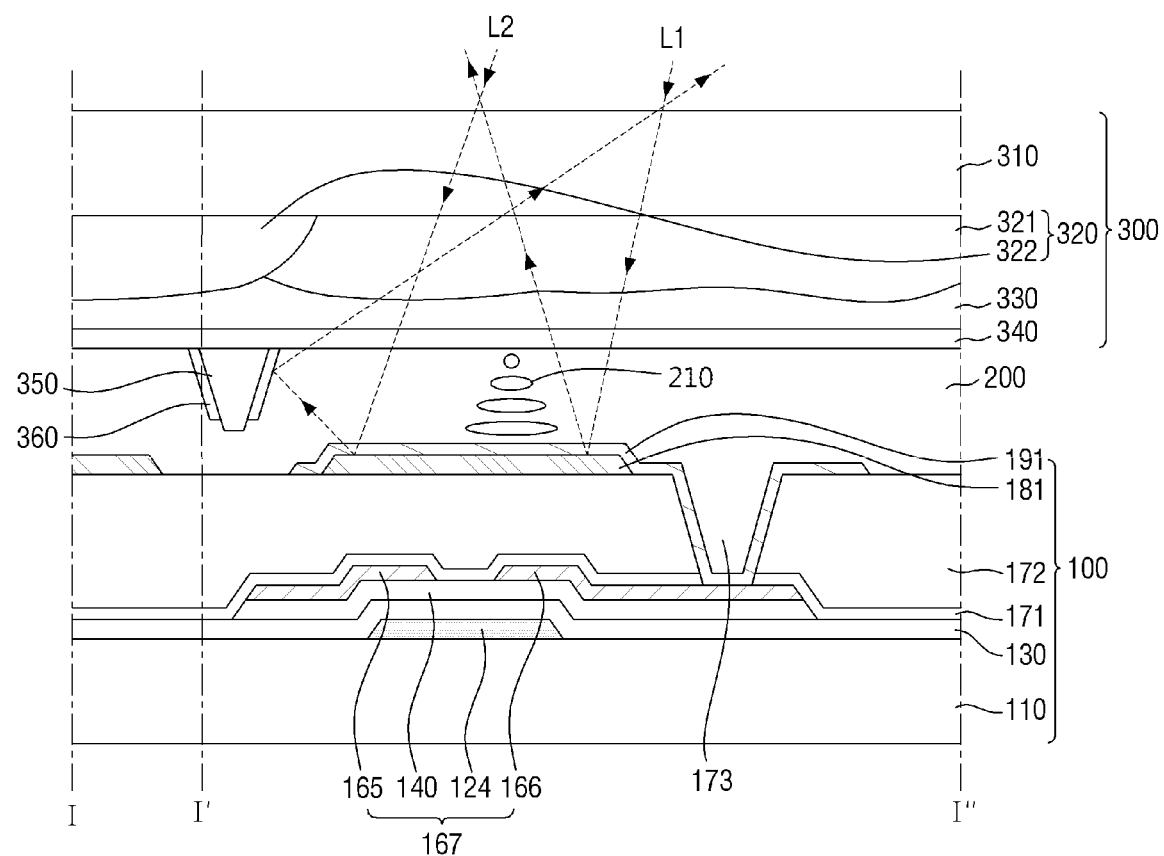
FIG. 2 is a cross-sectional view taken along the line I-I' of FIG. 1.

FIG. 1 is a layout view of a pixel of a liquid crystal display (LCD) according to an embodiment, and FIG. 2 is a cross-sectional view taken along the line I-I' of FIG. 1.

Referring to FIGS. 1 and 2, the LCD according to the current embodiment includes a first display substrate 100, a liquid crystal layer 200, and a second display substrate 300.

A switching device (e.g., a thin-film transistor 167) for driving liquid crystals 210 of the liquid crystal layer 200 is disposed in the first display substrate 100. The second display substrate 300 is a substrate disposed opposite to the first display substrate 100.

The liquid crystal layer 200 may be interposed between the first display substrate 100 and the second display substrate 300, and may include a plurality of liquid crystals 201 having a dielectric anisotropy. When an electric field is applied between the first display substrate 100 and the second display substrate 300, the liquid crystals 210 may rotate in a specific direction between the first display substrate 100 and the second display substrate 300, thereby transmitting or blocking light. Here, the term "rotate" may denote not only that the liquid crystals 210 actually rotate, but also that the arrangement of the liquid crystals 210 is changed by the electric field.

The LCD includes a plurality of pixels 10 arranged in a matrix form. Respective gray levels of the pixels 10 may be controllable independently of each other, and each of the pixels 10 may be a basic unit for displaying a specific color. In FIG. 1, a pixel 10, part of another pixel 10x disposed on a left side of the pixel 10, and part of another pixel 10y disposed on a right side of the pixel 10 are illustrated. Since the three pixels 10, 10x, and 10y have substantially the same structure, the pixel 10 located in the middle will be mainly described.

The first display substrate 100 will hereinafter be described.

The first display substrate 100 includes a first base substrate 110.

The first base substrate 110 may be an opaque insulating substrate. However, the first base substrate 110 is not necessarily an opaque insulating substrate and can also be a transparent insulating substrate.

In some embodiments, the first base substrate 110 may be curved along a direction. In some other embodiments, the first base substrate 110 may have flexibility. That is, the first base substrate 110 can be deformed by rolling, folding, bending, or the like.

A gate line 122, a gate electrode 124, and a storage line 125 are disposed on the first base substrate 110.

The gate line 122 carries a gate voltage for controlling the thin-film transistor 167. The gate line 122 may extend in a first direction D1.

Here, the first direction D1 is a direction perpendicular to a second direction D2 and a direction extending parallel to a side of the first base substrate 110. In addition, the first direction D1 can be defined as a direction indicated by an arbitrary straight line extending from the left side toward the right side as illustrated in FIG. 1. The second direction D2 can be defined as a direction indicated by an arbitrary straight line extending from an upper side toward a lower side as illustrated in FIG. 1.

The gate voltage may be provided from an external source, and may have a varying level. The level of the gate voltage may control the thin-film transistor 167 to be turned on or off.

The gate electrode 124 may protrude from the gate line 122 and may be physically connected to the gate line 122. The gate electrode 124 may be one component of the thin-film transistor 167 which will be described later.

The storage line 125 is disposed between each pair of gate lines 122. The storage line 125 may extend substantially along the first direction D1 and may be formed to have a predetermined area in each pixel 10, so as to maximize an overlap area with a storage electrode 168 which will be described later. A predetermined capacitance may be formed between the storage electrode 168 and the storage line 125, thereby preventing a sharp drop in the voltage level of a pixel electrode 191 which is connected to the storage electrode 168.

The gate line 122, the gate electrode 124, and the storage line 125 may be made of the same material. In an example, the gate line 122, the gate electrode 124, and the storage line 125 may be made of an aluminum (Al)-based metal such as aluminum or an aluminum alloy, a silver (Ag)-based metal such as silver or a silver alloy, a copper (Cu)-based metal such as copper or a copper alloy, a molybdenum (Mo)-based metal such as molybdenum or a molybdenum alloy, chrome (Cr), titanium (Ti), or tantalum (Ta). Each of the gate line 122, the gate electrode 124, and the storage line 125 may have a single layer structure or a multilayer structure including at least two conductive films having different physical properties.

A gate insulating film 130 is disposed on the gate line 122, the gate electrode 124, and the storage line 125. The gate insulating film 130 may be made of an insulating material such as silicon nitride or silicon oxide. The gate insulating film 130 may have a single layer structure or a multilayer structure including two gate insulating layers 130 having different physical properties.

A semiconductor layer 140 is disposed on the gate insulating film 130. At least part of the semiconductor layer 140 may overlap the gate electrode 124. The semiconductor layer 140 may be made of amorphous silicon, polycrystalline silicon, or an oxide semiconductor.

The semiconductor layer 140 may overlap not only the gate electrode 124 but also a data line 162, a source electrode 165 and a drain electrode 166 which will be described later.

Although not illustrated in the drawings, ohmic contact members may be additionally disposed on the semiconductor layer 140 in some embodiments. The ohmic contact members may be made of n+ hydrogenated amorphous silicon doped with an n-type impurity at a high concentration, or may be made of silicide. The ohmic contact members may be disposed on the semiconductor layer 140 in a pair. The ohmic contact members may be disposed between the source and drain electrodes 165 and 166 and the semiconductor layer 140, so that the source and drain electrodes 165 and 166 and the semiconductor layer 140 can have ohmic contact characteristics. When the semiconductor layer 140 includes an oxide semiconductor, the ohmic contact members may be omitted.

The data line 162, the source electrode 165, the drain electrode 166, and the storage electrode 168 are disposed on the semiconductor layer 140 and the gate insulating film 130.

The data line 162 may extend in the second direction D2 and intersect the gate line 122.

The data line 162 may be insulated from the gate line 122, the gate electrode 124 and the storage line 125 by the gate insulating film 130.

The data line 162 may provide a data voltage to the source electrode 165. Here, the data voltage may be provided from an external source and may have a varying level. The gray level of each pixel 10 may change according to the level of the data voltage.

The source electrode 165 may branch from the data line 162, and at least part of the source electrode 165 may overlap the gate electrode 124.

The drain electrode 166 may be separated from the source electrode 165 with the semiconductor layer 140 interposed between them based on FIG. 1, and at least part of the drain electrode 166 may overlap the gate electrode 124.

The storage electrode 168 may be connected to the drain electrode 166 through an area where a contact hole 173 is disposed, and may form a capacitance by overlapping the storage line 125.

The data line 162, the source electrode 165, the drain electrode 166, and the storage electrode 168 may be made of the same material. In an example, the data line 162, the source electrode 165, the drain electrode 166, and the storage line 125 may be made of aluminum, copper, silver, molybdenum, chromium, titanium, tantalum, or an alloy of these materials. In addition, each of the data line 162, the source electrode 165, the drain electrode 166, and the storage line 125 may have a multilayer structure composed of a lower layer (not illustrated) made of refractory metal and an upper layer (not illustrated) made of a material with low resistivity.

The gate electrode 124, the semiconductor layer 140, the source electrode 165, and the drain electrode 166 collectively constitute the thin-film transistor 167, which is a switching device.

A passivation film 171 is disposed on the gate insulating film 130 and the thin-film transistor 167. The passivation film 171 may be made of an inorganic insulating material, and may cover the thin-film transistor 167. The passivation film 171 may protect the thin-film transistor 167 and prevent a material contained in an organic insulating film 172 from flowing onto the semiconductor layer 140.

The organic insulating film 172 is disposed on the passivation film 171. The organic insulating film 172 may be made of an organic insulating material. The organic insulating film 172 may planarize steps formed by components disposed between the organic insulating film 172 and the first base substrate 110. In other words, an upper surface of the organic insulating film 172 may be substantially flat.

The contact hole 173 may be formed in the passivation film 171 and the organic insulating film 172. The contact hole 173 may partially expose the thin-film transistor 167, and more specifically may partially expose an upper surface of the drain electrode 166. The contact hole 173 may pass through the passivation film 171 and the organic insulating film 172 in a direction perpendicular to the first base substrate 110. A portion of the drain electrode 166 and the pixel electrode 191 disposed on the organic insulating film 172 may be physically connected to each other through the contact hole 173.

A reflective electrode 181 is disposed on the organic insulating film 172. The reflective electrode 181 may be disposed in an area other than the area where the contact hole 173 is formed in each pixel 10, and other than an area where a boundary between adjacent pixels 10 is formed.

The reflective electrode 181 reflects light, which is incident upon the first display substrate 100, back out of the second display substrate 300. To reflect light, the reflective electrode 181 may be made of a reflective opaque material such as Al, Ag, an Al alloy, or an Ag alloy. As the light reflectivity of the reflective electrode 181 is higher, the LCD may appear brighter.

The reflective electrode 181 may not have a pattern and may be formed to overlap most of the area in each pixel 10, except the area where the contact hole 173 is formed and the boundary between adjacent pixels 10.

The pixel electrode 191 is disposed on the reflective electrode 181. The pixel electrode 191 may overlap most of the area in each pixel 10, except the boundary between adjacent pixels 10. Unlike the reflective electrode 181, the pixel electrode 191 may overlap the area where the contact hole 173 is disposed, may be physically connected to the drain electrode 166 via the contact hole 173, and may thus receive the data voltage from the drain electrode 166.

The pixel electrode 191 may be formed as a unitary structure that overlaps the area in each pixel 10 but does not have a pattern. Alternatively, in some embodiments, the pixel electrode 191 may have a pattern including openings.

The pixel electrode 191 may be made of a transparent conductive material such as indium tin oxide (ITO), indium zinc oxide (IZO), indium tin zinc oxide (ITZO), or Al-doped zinc oxide (AZO).

The second display substrate 300 will hereinafter be described.

The second display substrate 300 includes a second base substrate 310, a color filter layer 320, an overcoat layer 330, and a common electrode 340.

The second base substrate 310 is disposed opposite to the first base substrate 110. The second base substrate 310 may have durability to withstand external impacts. The second base substrate 310 may be a transparent insulating substrate. For example, the second base substrate 310 may be a glass substrate, a quartz substrate, a transparent resin substrate, or the like. The second base substrate 310 may be shaped as a flat plate, but can also be curved in one or more specific directions.

The color filter layer 320 is disposed on a surface of the second base substrate 310 facing the first display substrate 100. The color filter layer 320 may be a photosensitive organic composition containing a pigment for realizing a color, and may include any one of red, green, and blue pigments. In an example, the color filter layer 320 may include a plurality of color filters. In an example, any one of the color filters may display any one of any primary colors, e.g., three primary colors of red, green, and blue. However, the inventive concept is not limited to this case, and any one of the color filters may also display any one of cyan, magenta, yellow, and white colors.

For ease of description, a color filter disposed on the right side of FIG. 2 will be defined as a first color filter 321, and a color filter disposed on the left side of FIG. 2 will be defined as a second color filter 322. The first color filter 321 and the second color filter 322 may display different colors, and each of the first color filter 321 and the second color filter 322 may display various colors.

In the current embodiment, a boundary between the first color filter 321 and the second color filter 322 is formed along the boundary of the pixel 10. More specifically, the boundary of the first color filter 321 is formed along the data line 162. However, the first color filter 321 and the second color filter 322 can be arranged in any manner as long as the boundary between the first color filter 321 and the second color filter 322 extends at least approximately along the boundary of each pixel 10.

The boundary between the first color filter 321 and the second color filter 322 may be formed by the overlap of part of an edge of the first color filter 321 and part of an edge of the second color filter 322. Since each of the first color filter 321 and the second color filter 322 is made of an organic material as described above, the boundary of each of the first color filter 321 and the second color filter 322 may be gentle. That is, the edge of the first color filter 321 and the edge of the second color filter 322 may partially overlap each other. Due to this overlap of the first color filter 321 and the second color filter 322, light components that can transmit through the first color filter 321 and the second color filter 322 may be limited at the boundary between the first color filter 321 and the second color filter 322. Therefore, the boundary between the first color filter 321 and the second color filter 322 may look dark even without a member for blocking light, such as a light blocking member.

Although the boundary between the first color filter 321 and the second color filter 322 looks dark, light may not be completely blocked at the boundary due to the absence of the light blocking member. Therefore, colors of light components passing through both the first color filter 321 and the second color filter 322 can be mixed. However, such color mixture can be prevented or minimized by a protruding pattern 350 and reflective members 360 which will be described later.

The overcoat layer 330 is disposed on a surface of the color filter layer 320 facing the first display substrate 100. The overcoat layer 330 may reduce a step formed by the color filter layer 320. In some embodiments, the overcoat layer 330 may be omitted.

The common electrode 340 is disposed on a surface of the overcoat layer 330 facing the first display substrate 100. The common electrode 340 may be made of a transparent conductive material such as ITO. IZO, ITZO, or AZO.

The common electrode 340 may be formed as a continuous layer over the entire surface of the second base substrate 310. That is, the common electrode 340 may be formed as a unitary layer that is disposed over the pixels 10 and includes no openings having a specific pattern.

A common voltage provided from an external source may be applied to the common electrode 340. Accordingly, the common electrode 340 may form an electric field in the liquid crystal layer 200 together with the pixel electrode 191. Here, the common voltage may be provided from the external source, and the level of the common voltage may be kept constant during the operation of the LCD. Hence, an electric field may be formed where the pixel electrode 191 and the common electrode 340 overlap each other, due to a difference between the level of the data voltage applied to the pixel electrode 191 and the level of the common voltage applied to the common electrode 340. The electric field may cause the liquid crystals 210 to be rotated or tilted.

The protruding pattern 350 may be formed on a surface of the common electrode 340 facing the first display substrate 100. The protruding pattern 350 may have a specific height, and may be disposed along the boundary between the first color filter 321 and the second color filter 322. The cross-sectional structure of the protruding pattern 350 may have a convex shape having a larger width closer to the second base substrate 310 and a smaller width farther from the second base substrate 310. In other words, sidewalls of the protruding pattern 350 may have an inclination angle of 90 degrees or less with respect to the second base substrate 310. More specifically, the sidewalls of the protruding pattern 350 may have an inclination angle of 20 to 90 degrees. Here, the sidewalls of the protruding pattern 350 may form a gentle slope as illustrated in FIG. 2, and may form a linear slope that makes the cross-sectional structure of the protruding pattern 350 have a trapezoidal shape or a triangular shape.

The protruding pattern 350 may not overlap the reflective electrode 181. As will be described later, the reflective members 360 may be disposed on the sidewalls of the protruding pattern 350 to block the transmission of light and to reflect light. Therefore, the protruding pattern 350 is disposed to not overlap the reflective electrode 181, thereby minimizing a reduction in transmittance. The protruding pattern 350 may be made of a transparent organic material.

The reflective members 360 are disposed on the sidewalls of the protruding pattern 350. The reflective members 360 may partially cover the sidewalls of the protruding pattern 350 and may extend along a direction in which the protruding pattern 350 extends.

The reflective members 360 may be made of a metallic material that reflects light, such as Al, Ag, an Al alloy, or an Ag alloy. However, the material of the reflective members 360 is not limited to these examples, and the reflective members 360 can also be made of other known materials that reflect light.

A reflective member 360 may be disposed on a sidewall of the protruding pattern 350, and another reflective member 360 may be disposed on an opposing sidewall of the protruding pattern 350. In other words, a pair of the reflective members 360 may be arranged on one protruding pattern 350 and may be physically separated and insulated from each other. However, when the reflective members 360 have electrical conductivity, they can be electrically connected to each other by the common electrode 340.

In the cross-sectional view of FIG. 2, the reflective members 360 and the common electrode 340 are physically connected to each other. However, the reflective members 360 and the common electrode 340 can also be separated from each other. When the reflective members 360 and the common electrode 340 are physically connected to each other and when the reflective members 360 have electrical conductivity, an electric field is formed in the liquid crystal layer 200 not only by the common electrode 340 but also by the reflective members 360. Therefore, the electric field can be distorted. However, the distortion of the electric field can be prevented by separating the reflective members 360 from the common electrode 340.

The protruding pattern 350 and the reflective members 360 can prevent or minimize the color mixture that may occur at the boundary between the first color filter 321 and the second color filter 322.

Specifically, light incident along a first light path L1 in FIG. 2 passes through the first color filter 321 and is reflected by the reflective electrode 181. Then, the light passes through the first color filter 321 again and is emitted to the outside of the second display substrate 300. Therefore, since the light traveling along the first light path L1 passes through only the first color filter 321, there is no concern about color mixture.

On the other hand, light incident along a second light path L2 in FIG. 2 passes through the first color filter 321 and is reflected by the reflective electrode 181. Then, the light proceeds toward the second color filter 322 instead of passing through the first color filter 321 again. Here, without the protruding pattern 350 and the reflective members 360, the light incident along the second light path L2 would be reflected by the reflective electrode 181 and then pass through the second color filter 322 to be emitted to the outside of the second display substrate 300. In this case, color mixture can occur. However, since the protruding pattern 350 and the reflective members 360 are provided, the light incident along the second light path L2 is reflected by the reflective electrode 181 and then reflected again by the reflective members 360. Then, the reflected light passes through the first color filter 321 and is emitted to the outside of the second display substrate 300. Thus, color mixture can be prevented or minimized at the boundary between the first color filter 321 and the second color filter 322.

The liquid crystal layer 200 will hereinafter be described.

A plurality of liquid crystals 210 may be arranged in the liquid crystal layer 200. When an electric field is formed between the first display substrate 100 and the second display substrate 300, the liquid crystals 210 may rotate or tilt in a specific direction between the first display substrate 100 and the second display substrate 300, thereby changing the polarization of light.

The liquid crystals 210 may be arranged in a 90-degree twisted manner between the first display substrate 100 and the second display substrate 300 facing each other. That is, twisted nematic (TN) mode liquid crystals 210 may be arranged. However, the alignment mode of the liquid crystals 210 is not limited to the TN mode. Instead, various alignment modes can be used, such as a vertical alignment mode in which the liquid crystals 210 are arranged vertically between the first display substrate 100 and the second display substrate 300 using a vertical alignment film, and an in-plane switching (IPS) mode in which the liquid crystals 210 are arranged and switched horizontally.

A method of manufacturing the protruding pattern 350 and the reflective members 360 of the LCD according to the current embodiment will hereinafter be described.

Figure 3:
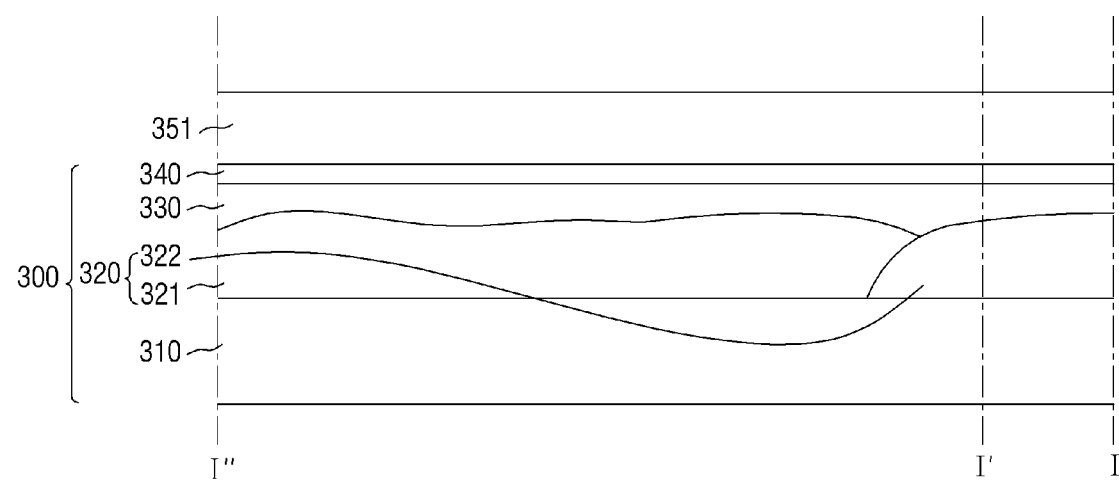
FIG. 3, FIG. 4, FIG. 5 and FIG. 6 are cross-sectional views illustrating a method of manufacturing an LCD according to an embodiment.
Figure 4:
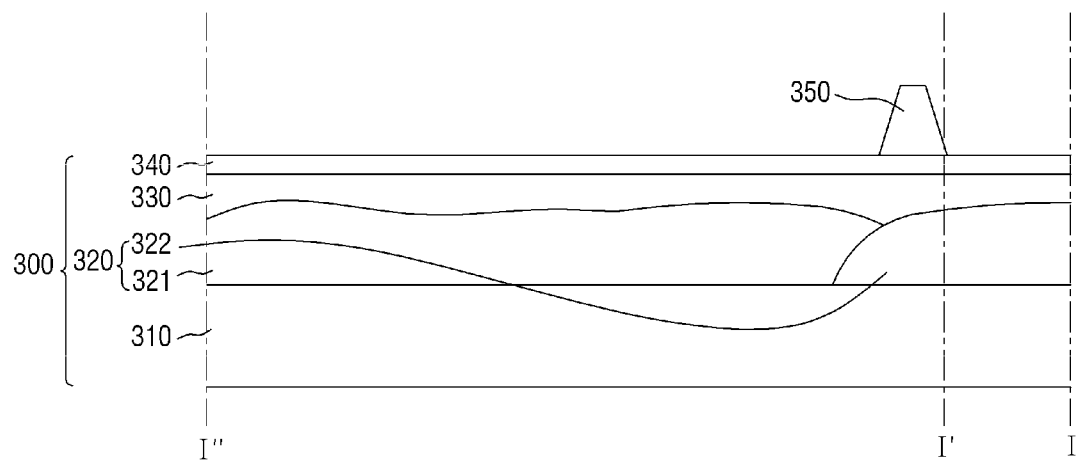
Figure 5:
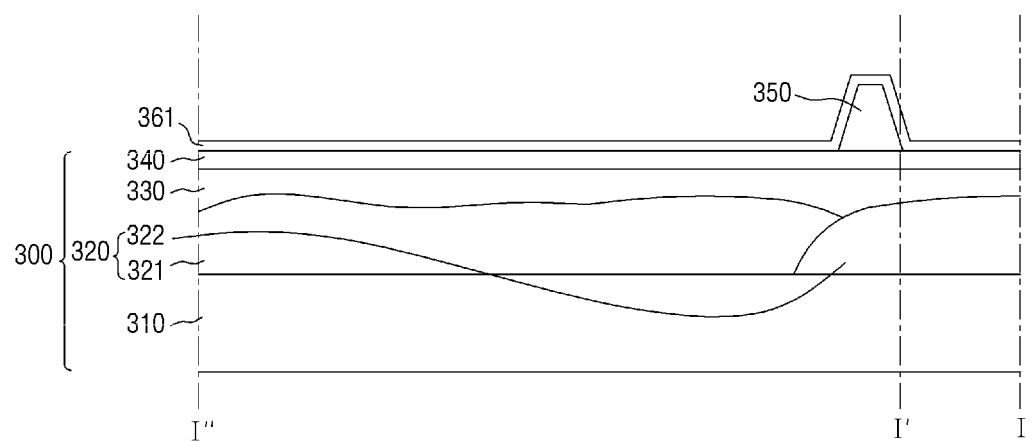
Figure 6:
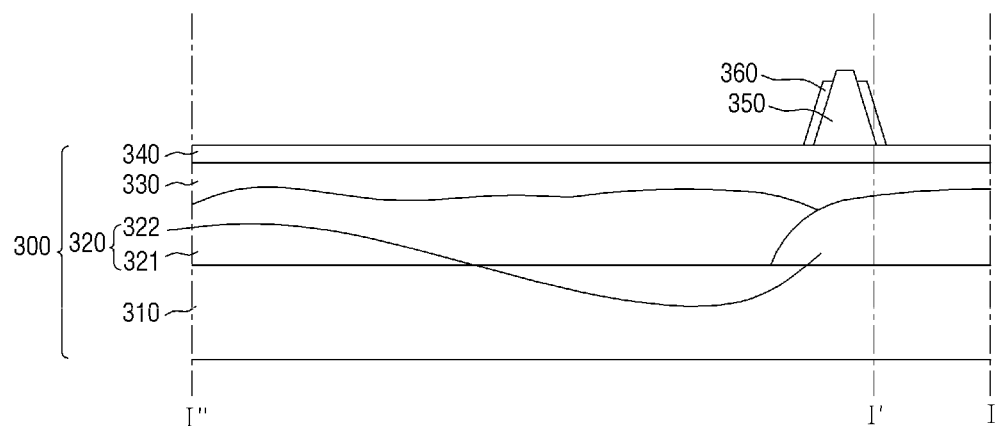

FIG. 3. FIG. 4, FIG. 5 and FIG. 6 are cross-sectional views illustrating a method of manufacturing an LCD according to an embodiment.

FIG. 3. FIG. 4, FIG. 5 and FIG. 6 correspond to cross-sectional views of the second display substrate 300 taken along the line I-I' of FIG. 1. In FIG. 2, the second display substrate 300 is placed to face the first display substrate 100. Therefore, the second display substrate 300 is disposed in an upper part in FIG. 2. However, since FIG. 3, FIG. 4, FIG. 5 and FIG. 6 illustrate only the second display substrate 300, the second display substrate 300 of FIG. 2 may be rotated by 180 degrees.

The process of manufacturing an LCD can be largely divided as follows. That is, after a first display substrate 100 and a second display substrate 300 are separately manufactured, they may be placed to face each other. Then, a liquid crystal layer 200 may be injected between the first display substrate 100 and the second display substrate 300, and a gap between the first display substrate 100 and the second display substrate 300 may be sealed. The cross-sectional views of FIG. 3, FIG. 4. FIG. 5 and FIG. 6 illustrate part of the process of manufacturing the second display substrate 300 in the process of manufacturing an LCD. Specifically, a method of manufacturing a protruding pattern 350 and reflective members 360 according to an embodiment will be mainly described.

Referring to FIG. 3, a color filter layer 320 is formed on a second base substrate 310. Each color filter included in the color filter layer 320 may be formed by a different mask process. That is, a first color filter 321 may be formed by a first mask process, and a second color filter 322 may be formed by a second mask process.

In the following description, the term "mask process" denotes a patterning process performed using a photomask. One unit mask process includes an exposure and development process, and may further include an etching process.

Next, an overcoat layer 330 is formed on the color filter layer 320. The overcoat layer 330 may be a laminated film of an organic material and may be formed by chemical vapor deposition, sputtering, or other known processes.

Next, a common electrode 340 is formed on the overcoat layer 330.

Next, a photosensitive organic material layer 351 is formed on the first base substrate 110 having the color filter layer 320, the overcoat layer 330, and the common electrode 340.

Referring to FIG. 4, the photosensitive organic material layer 351 is exposed to ultraviolet light through a mask having a pattern, and developed to form the protruding pattern 350. The photosensitive organic material layer 351 is made of a material that undergoes a polymerization reaction or decomposition reaction when exposed to light of a predetermined wavelength. The photosensitive organic material layer 351 may be of a negative type in which a chemical is insoluble by exposure, or a positive type in which the chemical is soluble by exposure. Either of the negative type or the positive type can be selected. The exposure can be performed by a photolithography process.

In other words, the protruding pattern 350 is formed through one mask process.

Referring to FIG. 5, a reflective member material layer 361 is formed on the common electrode 340 and the protruding pattern 350.

Referring to FIG. 6, one mask process of coating a photosensitive material on the reflective member material layer 361, exposing and developing the photosensitive material, and then etching the photosensitive material to form patterns of the reflective members 360 is performed. That is, the reflective members 360 are formed on sidewalls of the protruding pattern 350 by one mask process.

Finally, an LCD is manufactured by using the second display substrate 300 manufactured through the processes of FIG. 3, FIG. 4, FIG. 5 and FIG. 6, and the first display substrate 100 manufactured separately from the second display substrate 300.

Although the protruding pattern 350 and the reflective members 360 have been described as being formed by a mask process, they can also be manufactured by other known processes. In an example, the protruding pattern 350 and the reflective members 360 can be formed by an inkjet process.

Figure 7:
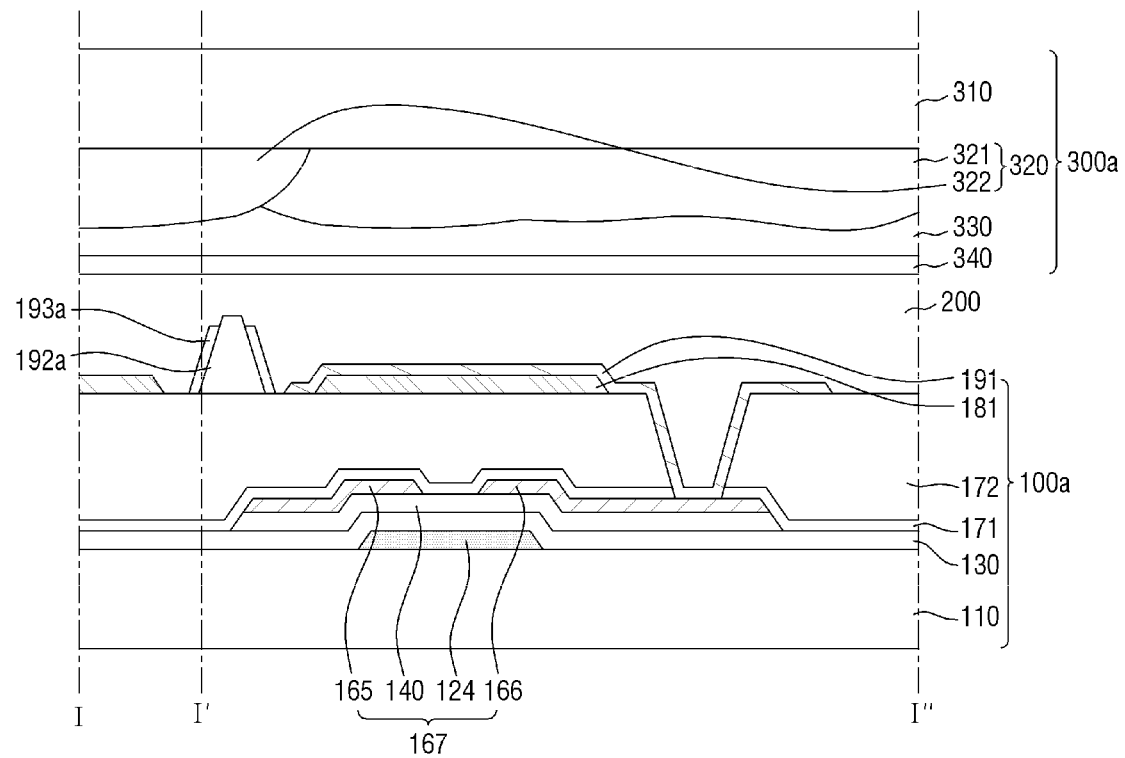
FIG. 7 is a cross-sectional view of an LCD according to an embodiment, taken along the line I-I' of FIG. 1.

FIG. 7 is a cross-sectional view of an LCD according to an embodiment, taken along the line I-I' of FIG. 1.

The LCD according to the current embodiment is different from the LCD of FIG. 2 in that a protruding pattern 192a and reflective members 193a are disposed not in a second display substrate 300a but in a first display substrate 100a. Therefore, a description of reference numerals and components identical or similar to those of FIG. 2 will be omitted, and the LCD according to the current embodiment will be described, focusing mainly on differences from the LCD of FIG. 2.

Referring to FIG. 7, in the LCD according to the current embodiment, the protruding pattern 192a and the reflective members 193a are disposed on an organic insulating film 172. More specifically, the protruding pattern 192a and the reflective members 193a may be disposed on an exposed upper surface of the organic insulating film 172 or on an upper surface of a pixel electrode 191 of the first display substrate 100a.

The arrangement of the protruding pattern 192a and the reflective members 193a in plan view may be the same as the arrangement described above with reference to FIG. 1. Accordingly, the contribution of the protruding pattern 192a and the reflective members 193a to minimizing or preventing color mixture may be the same as that described above with reference to FIGS. 1 and 2. That is, the protruding pattern 192a and the reflective members 193a can be formed in any one of the first display substrate 100a and the second display substrate 200a.

In addition, a method of manufacturing the protruding portion member 192a and the reflective members 193a disposed in the first display substrate 100a may be the same as the manufacturing process described above with reference to FIGS FIG. 3. FIG. 4, FIG. 5 and FIG. 6.

Figure 8:
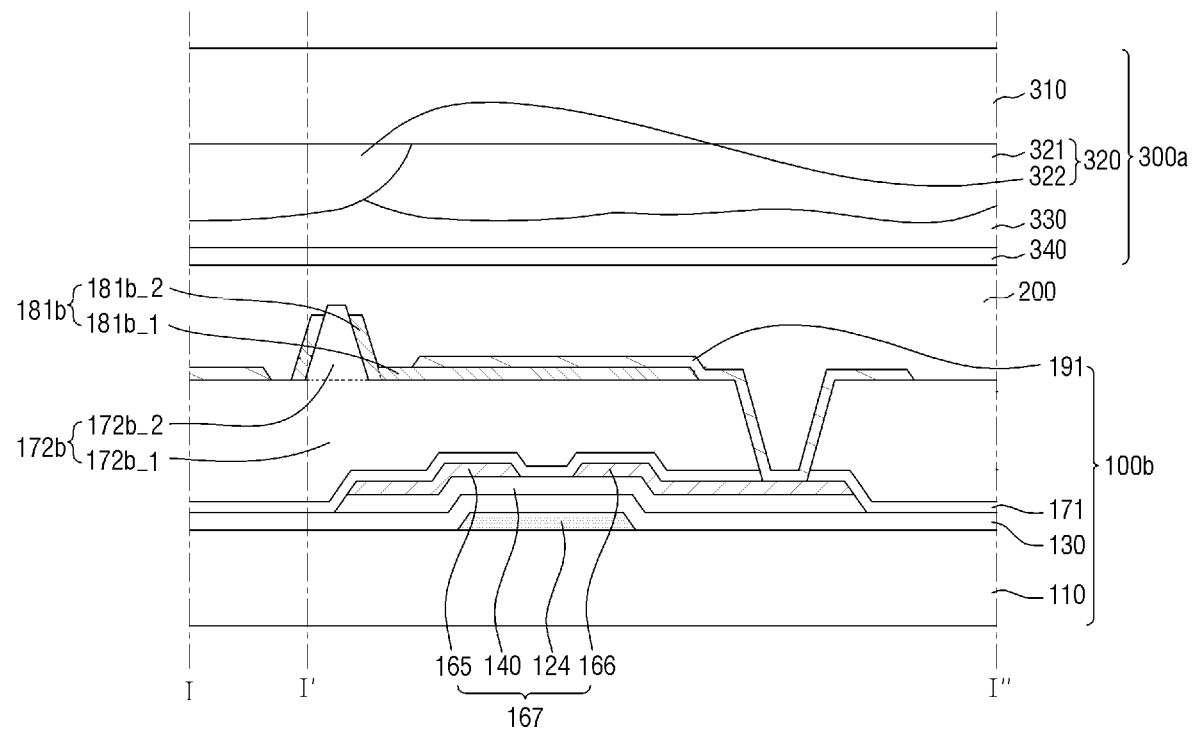
FIG. 8 is a cross-sectional view of an LCD according to an embodiment, taken along the line I-I' of FIG. 1.

FIG. 8 is a cross-sectional view of an LCD according to an embodiment, taken along the line I-I' of FIG. 1.

The LCD according to the current embodiment is different from the LCD of FIG. 7 in that a protruding pattern and an organic insulating film are integrally formed and that reflective members and a reflective electrode are integrally formed. Therefore, a description of reference numerals and components identical or similar to those of FIG. 7 will be omitted, and the LCD according to the current embodiment will be described, focusing mainly on differences from the LCD of FIG. 7.

Referring to FIG. 8, an organic insulating film 172b of the LCD according to the current embodiment includes a flat portion 172b_1 and a protruding portion 172b_2. The flat portion 172b_1 is disposed on a passivation film 171 and refers to a portion of the organic insulating film 172b in an area (where an upper surface of the organic insulating film 172b is flat) other than an area where a contact hole 173 is disposed. On the other hand, the protruding portion 172b_2 refers to a pattern protruding upward (based on FIG. 8) from the flat portion 172b_1 toward the second display substrate 300a. The protruding portion 172b_2 may have the same shape and perform the same function as the protruding pattern 192a of FIG. 7.

In addition, a reflective electrode 181b of the LCD according to the current embodiment includes a first reflective portion 181b_1 and second reflective portions 181b_2.

The first reflective portion 181b_1 reflects light incident from outside a second display substrate 300a, such that the light can be emitted back to the outside of the second display substrate 300a. The first reflective portion 181b_1 may perform the same function as the reflective electrode 181 described above with reference to FIG. 1 and FIG. 2.

The second reflective portions 181b_2 may extend from the first reflective portion 181b_1 and may be disposed along sidewalls of the protruding portion 172b_2 of the organic insulating film 172b to reflect light. The second reflective portions 181b_2 may perform the same function as the reflective members 360 described above with reference to FIG. 1 and FIG. 2.

Although the organic insulating film 172b includes the flat portion 172b_1 and the protruding portion 172b_2 and the reflective electrode 181b includes the first reflective portion 181b_1 and the second reflective portions 181b_2, the planar and cross-sectional structures of the protruding portion 172b_2 and the second reflective portions 181b_2 may be substantially the same as those of the protruding pattern 192a and the reflective members 193a described above with reference to FIG. 7. Accordingly, the contribution of the protruding portion 172b-2 and the second reflective portions 181b_2 to minimizing or preventing color mixture may be the same as that described above with reference to FIG. 7.

Further, in the structure of the LCD according to the current embodiment, no additional mask process is required to implement structures similar to the protruding pattern 192a and the reflective members 193a of FIG. 7. Thus, costs can be saved. This will now be described in detail with reference to FIG. 9, FIG. 10, FIG. 11 and FIG. 12.

FIG. 9, FIG. 10, FIG. 11 and FIG. 12 are cross-sectional views illustrating a method of manufacturing an LCD according to an embodiment.

FIG. 9, FIG. 10, FIG. 11 and FIG. 12 correspond to cross-sectional views of a first display substrate 100b taken along the line I-I' of FIG. 1.

Figure 9:
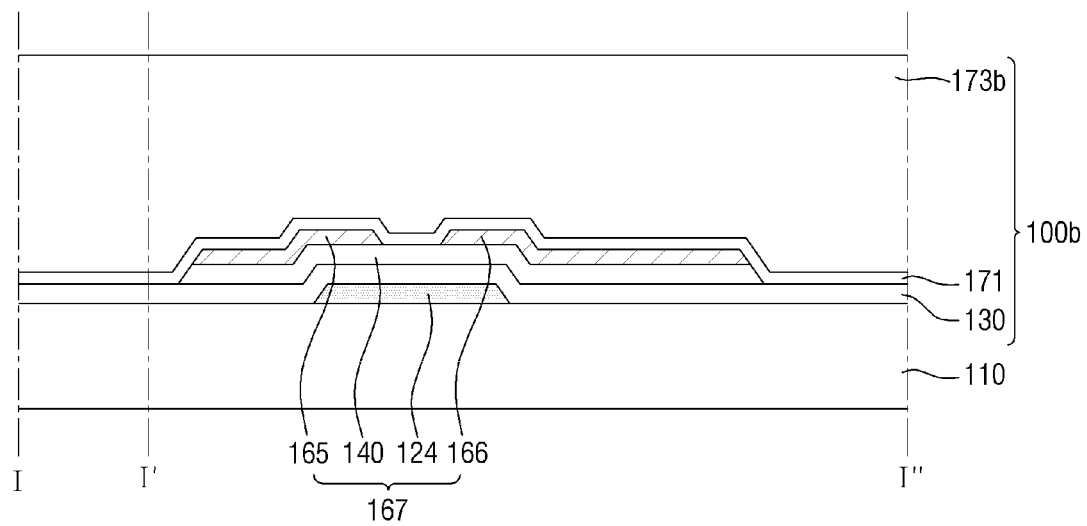
FIG. 9, FIG. 10.

First, referring to FIG. 9, a gate electrode 124 is formed on a first base substrate 110. The gate electrode 124 is formed by one mask process. Next, a gate insulating film 130 is formed. The gate insulating film 130 may be made of silicon nitride, silicon oxide, or a laminated film of these materials, and may be formed by chemical vapor deposition or sputtering. Next, a semiconductor layer 140, a source electrode 165, and a drain electrode 166 are formed. The semiconductor layer 140, the source electrode 165, and the drain electrode 166 may be formed by a single mask process. Next, a passivation film 171 is formed.

Next, an organic insulating material layer 173b is formed on the passivation film 171.

Figure 10:
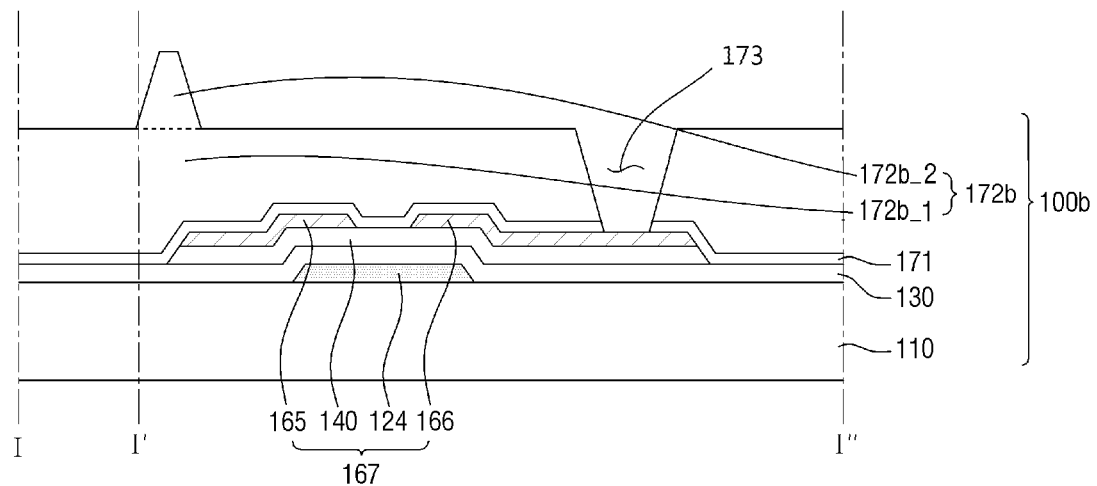

Referring to FIG. 10, the organic insulating material layer 173b is exposed to ultraviolet light through a mask having a pattern, and is then developed to form an organic insulating film 172b including a flat portion 172b_1, a protruding portion 172b_2 and a contact hole 173.

Here, the mask may be a halftone mask or a slit mask, and a different amount of light may be irradiated to each area of the organic insulating material layer 173b in the exposure process. That is, the amount of light irradiated to an area where the protruding portion 172b_2 is formed may be different from the amount of light irradiated to an area where the flat portion 172b_1 is formed and to the amount of light irradiated to an area where the contact hole 173 is formed.

Figure 11:
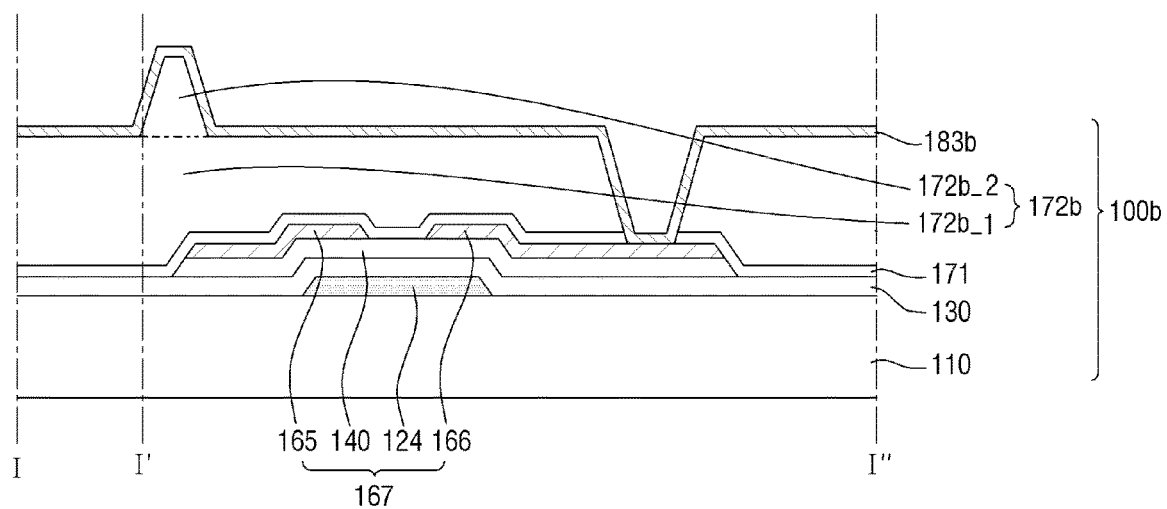
FIG. 11 and FIG. 12 are cross-sectional views illustrating a method of manufacturing an LCD according to an embodiment.

Referring to FIG. 11, a reflective electrode material layer 183b is formed on the organic insulating film 172b including the flat portion 172b_1 and the protruding portion 172b_2.

Figure 12:
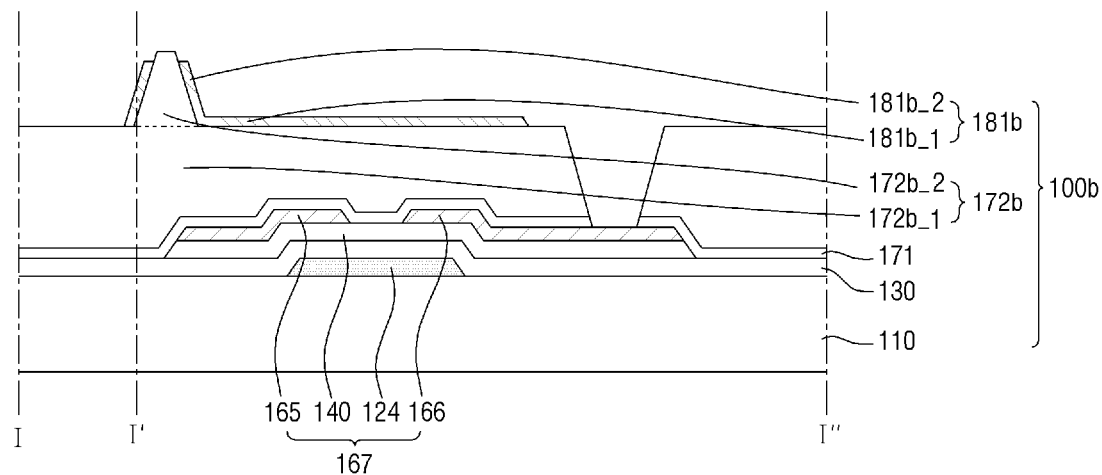

Referring to FIG. 12, one mask process is performed. In the mask process, a photosensitive material is coated on the reflective electrode material layer 183b, exposed and developed, and then etched to form a reflective electrode 181b which includes a first reflective portion 181b_1 and second reflective portions 181b_2.

Finally, an LCD may be manufactured by using the first display substrate 100b manufactured through the processes of FIG. 9. FIG. 10, FIG. 11 and FIG. 12, and a second display substrate 300a manufactured separately from the first display substrate 100b.

Therefore, if the processes of FIG. 9, FIG. 10. FIG. 11 and FIG. 12 are performed, the LCD of FIG. 8 having the same structures as the protruding pattern 192a and the reflective members 193a illustrated in FIG. 7 can be manufactured without requiring more than the number of mask processes required to manufacture a conventional LCD. Thus, costs can be reduced.

According to embodiments, an LCD in which color mixture is minimized can be provided.

However, the effects of the inventive concept are not restricted to the one set forth herein. The above and other effects of the inventive concept will become more apparent to one of daily skill in the art to which the inventive concept pertains by referencing the claims. Various features of the above described and other embodiments can be mixed and matched in any manner, to produce further embodiments consistent with the invention.

What is claimed is:

1. An LCD comprising:
a first display substrate:
a second display substrate which faces the first display substrate; and
a liquid crystal layer which is disposed between the first display substrate and the second display substrate,
wherein the first display substrate comprises a first base substrate, a reflective electrode which is disposed on the first base substrate, a pixel electrode which is disposed on the reflective electrode, a protruding pattern which is disposed on the pixel electrode, and reflective members which are disposed on sidewalls of the protruding pattern,
wherein the second display substrate comprises:
a second base substrate, and
a color filter layer which comprises a first color filter disposed on a surface of the second base substrate which faces the first base substrate, and a second color filter configured to display a different color from that of the first color filter, and
wherein the protruding pattern extends along a boundary between the first color filter and the second color filter.

2. The LCD of claim 1, wherein two of the reflective members are separated from each other.

3. The LCD of claim 1, wherein the boundary between the first color filter and the second color filter is formed by an overlap between the first color filter and the second color filter.

4. An LCD comprising:
a first display substrate:
a second display substrate which faces the first display substrate; and
a liquid crystal layer which is disposed between the first display substrate and the second display substrate,
wherein the first display substrate comprises a first base substrate, an organic film which is disposed on the first base substrate and which comprises a flat portion having a flat upper surface and a protruding portion protruding from the flat portion toward the second display substrate, a reflective electrode which comprises a first reflective portion disposed on the flat portion and second reflective portions disposed on sidewalls of the protruding portion, and a pixel electrode which is disposed on the reflective electrode, and
wherein the second display substrate comprises a second base substrate, and a color filter layer which comprises a first color filter disposed on a surface of the second base substrate that faces the first base substrate and a second color filter configured to display a different color from that of the first color filter.

5. The LCD of claim 4, wherein the protruding portion extends along a boundary between the first color filter and the second color filter.

6. The LCD of claim 5, wherein the boundary between the first color filter and the second color filter is formed by an overlap between the first color filter and the second color filter.

7. The LCD of claim 4, wherein the pixel electrode is a light transmissive electrode.

8. The LCD of claim 4, wherein two of the second reflective portions are separated from each other.

9. The LCD of claim 4, wherein the organic film is formed using a halftone mask.

\* \* \* \* \*